Nov. 14, 1950     G. F. ADAMS     2,529,583
CONTROLLING FLOW OF SUBDIVIDED SOLID PARTICLES
Filed Dec. 6, 1948
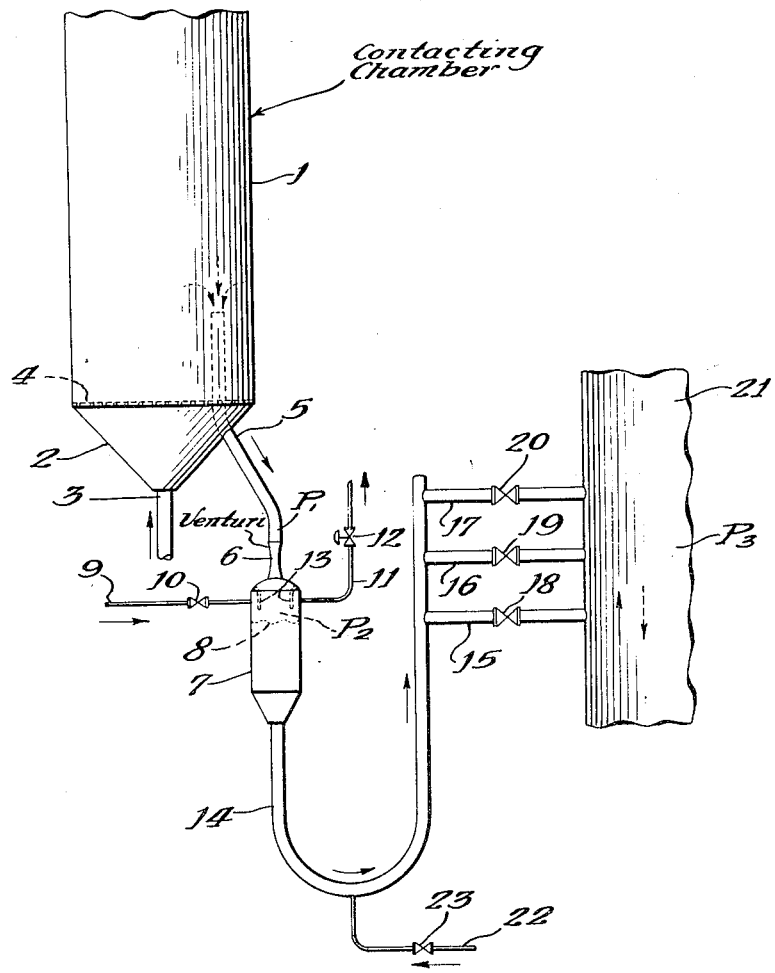
Inventor:
George F. Adams
By: M. P. Venema
    Attorney
Philip J. Liggett
    Agent Patented Nov. 14, 1950

2,529,583

UNITED STATES PATENT OFFICE 2,529,583

CONTROLLING FLOW OF SUBDIVIDED SOLID PARTICLES

George F. Adams, Riverside, Ill., assignor to Universal Oil Products Company, Chicago, Ill., a corporation of Delaware Application December 6, 1948, Serial No. 63,824

4 Claims. (Cl. 214—17)

This invention relates to an improved means for controlling the rate of flow of subdivided solid particles from one contact zone to another, by the use of fixed venturi restriction and adjustable pressure controlling means, whereby to eliminate a slide valve, star feeder, or other mechanical control device for metering the flow of solid particles in a processing operation.

The flow control method of this invention may be used to particular advantage with catalysts or other solid material utilized in catalytic or chemical processing operations wherein solid particles are passed continuously from one zone to another. For example, in the moving and fluidized bed catalytic conversion operation, catalyst is used in powdered or specially manufactured subdivided form within an aerated and movable fluid-like contact bed of a reaction zone, to effect the catalytic conversion of a reactant stream, such as the cracking of hydrocarbons. Such an operation is also preferably carried out in a continuous manner, with the solid subdivided catalytic material being passed in a fluid-like stream to a regenerating zone, wherein the particles are reactivated in a suitable manner to permit their reuse in the reaction zone. Therefore, the material is preferably passed continuously from the reaction zone to the regenerating zone and likewise in a continuous stream from the regenerating zone to the reaction zone in a cyclic flow and under suitable controlled conditions of temperature, pressure, quantity of materials, and at rates of flow maintaining a continuous and efficient conversion operation. In any operation, using moving streams of particles, all portions of the unit contacted by the particles may be subjected to erosion, with mechanical control devices being particularly subjected to operating wear and erosion, and as a result operating difficulties are encountered frequently with such devices.

It is therefore a principal object of the present invention to provide a method for controlling the pressure drop and flow rate of a particle stream passing from one contacting zone to another in a manner eliminating the usual mechanical feeding devices, orifice valves, slide valve or the like, for controlling the rate of flow of solid particles in the transfer stream.

It is also an object of the present invention to use a fixed venturi in a manner permitting adjustable and controllable pressure drop across the venturi and thereby control the rate of flow of particles from one zone to another.

It is still another objection of the present invention to provide a method and means for regulating the flow of the solid particles from one contact zone to another by the use of a venturi restriction and a pressure control system which is not readily subjected to harmful erosive wear, or to plugging and coking such as is encountered in many types of adjustable orifice devices and slide valves and the like, particularly in high temperature hydrocarbon processing.

Briefly the present invention embodies a method for controlling the flow of subdivided solid contact particles from one confined contacting zone to another by passing the solid particles in a continuous stream through a venturi shaped restriction into an enlarged receiving zone, introducing an inert fluid medium into the receiving zone at a controlled superatmospheric pressure, continuously discharging the solid particles from the lower end of the receiving zone in a U-path and maintaining a pressure seal on the receiving zone, and continuously discharging the particles from the U-path into another confined contacting zone at a rate dependent upon the pressure differential maintained across the venturi.

The inert fluid medium may be nitrogen, steam, carbon dioxide, or perhaps air, the particular medium being somewhat dependent upon the particular processing operation in which this control method is utilized. The enlarged receiving zone is preferably vertically disposed and elongated in order to provide a variable level of solid material in the lower portion thereof. The pressure supplying fluid medium is charged to the uuper end of the receiving zone in order to effect a pressure on the particle stream being discharged from the venturi restriction and the fluid medium is discharged from the receiving zone through an adjustable control which will provide a desired controlled superatmospheric pressure therein. The particles being discharged from the receiving zone pass in a pressure sealing leg effecting a U-column of the solid particles, whereby the seal leg maintains the desired superatmospheric pressure within the receiving zone and at the outlet of the venturi restriction connecting therewith. Also, in order to provide greater adjustability of the flow control method of this invention, the discharge leg of the U-tube arrangement is provided in a manner which permits varying heights in the legs thereof and the discharge of the solid particle stream at various levels into the next contacting chamber, or alternately, a transfer conduit connecting with the subsequent contacting chamber.

It is a particular advantage of this invention to provide a method which regulates the flow of subdivided solid particles from one zone to another without utilizing the usual mechanical types of feeding or valve mechanisms. In operation, the regulation of the fluid medium being charged to the receiving zone serves to control and adjust the rate of flow of the particles from the first contacting zone through the receiving zone to the second contacting zone. A smooth venturi restriction is also an advantage over the usual orifice or slide valve type of controlling device, in that it is less subject to erosion as well as plugging by solid particles. It is also easier to compensate for erosive wear in the venturi by altering the pressure on the downstream side thereof than it is to correct for excessive wear in orifices, or blades, or other parts of any mechanical feeding device.

The improved system for regulating the flow of solid particles from one zone to another is also readily adaptable to automatic control methods whereby the flow of the particles is maintained through mechanically operating pressure control instruments.

Reference to the accompanying drawing will serve to further clarify the method of controlling particle flow in accordance with the present invention and to point out further advantageous features of the operation.

Referring now to the drawing, there is shown a contacting chamber 1 suitable to receive and discharge catalyst or other subdivided solid particles in a contacting operation. The lower end of the chamber 1 has a tapered head 2, an inlet 3 and an interior perforated plate 4, whereby particles in a vaporous or gaseous stream may be introduced through the inlet 3 and pass upwardly into the interior of the contacting chamber and subsequently contacted with the fluid stream in a turbulent fluidized type of bed within the lower portion of the contacting chamber 1. An open-ended conduit 5 communicates with the interior of the chamber 1 and provides means for continuously withdrawing the finely divided material from the contact bed within the chamber. This arrangement is typical of a fluidized contacting operation, however, it is not intended to limit the present method of controlling the flow of solid particles from the contacting chamber 1 to a fluidized operation nor the particles to subdivided catalysts.

The withdrawal stream of solid particles, descending in the conduit 5, passes through a venturi 6 and is discharged into a receiver 7. The receiving zone in chamber 7 provides an enlarged disengaging space where the particles may be allowed to settle into a continuously moving column of particles, and in the drawing, the upper extremity of the column of subdivided particles is indicated by the broken line 8. A fluid inlet line 9, with control valve 10, provides means for introducing or bleeding in a stream preferably gaseous, such as steam, nitrogen, or the like and maintaining a given desired pressure within the upper portion of the receiving chamber 7. An outlet line 11 having a control valve 12 also provides means for releasing the gaseous medium passed to the receiver, and with a suitable pressure control valve 12 there may readily be maintained a desired pressure in the receiving zone. Suitable baffles 13 may be placed over the inlet and outlet bleed connections in order to prevent a turbulent action with the particles descending through the receiving zone 7. Although not shown in the drawing, means may also be provided for recovering solid particles, which may be carried out with the bleed stream through line 11, and for returning them to the receiving chamber 7, or the transfer conduit 14 connecting with the lower end of the chamber 7. The fluid bleed-in system connecting with receiver chamber 7, provides means for controlling pressure $P_2$ at the outlet end of the venturi 6 and in turn provide means for maintaining a controlled variable pressure drop across the venturi 6. The pressure at the inlet end of the venturi 6 is indicated in the drawing as being $P_1$, while the pressure in the upper portion of the receiver chamber 7 or at the outlet end of the venturi 6, is indicated by the symbol $P_2$.

In order to maintain a given desired pressure within the receiving zone, the column of solid particles descending from the chamber 7 are passed through a U-tube arrangement provided by conduit 14 that effects a pressure seal within chamber 7 by means of a column of solid particles in the seal leg. In the particular embodiment illustrated, a plurality of outlet conduit 15, 16 and 17, with the respective valves 18, 19 and 20, provide adjustable means for withdrawing the particles at varying levels in the rising leg of U-tube pressure seal. Normally a fixed height outlet from the outlet leg of the U-column is used and can accommodate slight pressure changes, however, where a rapid flow of solid particles is desired and a relatively low pressure $P_2$ maintained within the receiving chamber 7, it may be found, for example, that the lower valve 18 should be opened and the conduit 15 utilized to pass the solid material into the subsequent contacting chamber or transfer conduit 21. On the other hand, where a relatively high pressure $P_2$ is desired, the particle level may become rather low in the receiving chamber 7 and the particle column in the right-hand leg of the U-tube arrangement rather high, necessitating the use of the upper transfer conduit 17, with the valve 20 being opened and the lower valves 18 and 19 are closed. The solid material in the U-shaped conduit 14 must of course be maintained in a movable state so that the column of particles may exert a proper hydrostatic action, as well as maintain and permit a constant movement and transfer of particles to the subsequent contacting zone. Suitable aeration may be provided by one or more aerating lines 22 having control valve 23, placed advantageously to prevent clogging of the particles within the U-tube.

To maintain a suitable and constant flow of particles from one contacting chamber to another, the pressure within the second contacting chamber or transfer conduit 21, indicated as $P_3$, plus the hydrostatic pressure in the outlet leg of U-column, must of course be somewhat smaller than the pressure $P_2$ maintained in the upper portion of the receiving chamber 7 and the hydrostatic pressure in the inlet leg of the U-column. The $P_2$—$P_3$ pressure differential is maintained by the U-column of particles in the sealing leg and of course is variable within limits as hereinbefore noted, by varying the level of the particles within the respective legs of the U-tube conduit. In order to maintain a steady flow of the stream of particles, the normal pressure differential $P_2$—$P_3$ should of course be maintained substantially constant.

The rate of withdrawal of the solid particles from the first contacting chamber 1, or alternately the rate of transferring the solid particles from one zone to another, is maintained and controlled by the pressure differential across the venturi 6. The difference, $P_1$—$P_2$ is the driving force by which the particle flow to the receiving chamber is obtained and controlled. Actually, the flow through a venturi is proportional to the square root of the difference of the pressures at the inlet end of the venturi and at outlet end of the venturi, $(\sqrt{P_1—P_2})$, with $P_1$ being controlled by the pressure within chamber 1 and the length of the column of solid particles providing additional hydrostatic pressure up to the point of the entrance of the venturi 6, and with $P_2$ being controlled by the pressure of the bleed-in stream introduced through line 9, or control valve 12, in the outlet line 11.

In a preferred control arrangement, the venturi 6 should not have a small vena contracta, that is the small area of the restricted zone, across the venturi should not be too much smaller than the line size of conduit 5, in order to allow a greater range of control over the particle flow. Thus, in operation the pressure $P_2$ when varied will effect a greater control over the rate of flow of the solid particles. In the normal operation of a conversion unit, the pressure $P_1$ would normally be substantially constant and the pressure $P_2$ adjusted to provide a desired rate of flow of the particles from one zone to another, with $P_3$ in the subsequent contacting zone, like $P_1$, remaining substantially constant and the height of the particle column in the tube conduit being allowed to assume proper levels to maintain the seal on the receiving chamber 7 and the control pressure $P_2$. However, the present improved control arrangement may readily be made to adapt itself to a varying operation or to upset conditions in the contacting unit which in turn result in a varying pressure $P_1$. The pressure of the bleed-fluid or gas entering through line 9 or pressure control valve 12, may be automatically controlled and varied in accordance with a change in the pressure within chamber 1, while the levels in the pressure seal leg may be allowed to automatically adjust themselves to maintain a desired pressure $P_2$.

It is not intended to limit the present method of controlling and metering the flow of solid particles to any particular type of particles or to any particular type of operation, however as hereinbefore noted, the method of control is particularly adaptable for catalytic operations wherein small subdivided solid particles of catalysts are passed continuously from one contacting zone to another. In such catalytic operations, a stripping action may well be combined with the control method. For example, where catalyst particles moving in a continuous stream have entrained gaseous or volatile material passing with the particles, it is frequently advantageous to strip and remove them before they reach the subsequent contacting zone, in which case a stripping medium such as steam or other inert medium is passed through the moving stream to remove such entrained vapors or volatile matter. The upper portion of the receiving chamber 7 and the bleed-in stream composed of a suitable stripping medium, provides an advantageous way of effecting a stripping of the particle stream during their transfer from one contacting chamber to another.

While it is necessary that the particles being transferred must be of a comminuted nature and capable of being transferred as a fluid stream, it is not intended to limit the control method to catalysts or to operations which utilize fluidized contact of the particles in the particular contacting chambers of the unit. Also it is not intended to limit the pressure seal leg as provided by conduit 14 to an exact U-arrangement as shown, with the various outlet conduits 15, 16 and 17, for obviously equivalent types of seal legs may be constructed, and other means, such as a weir, may be employed at the outlet end of the U-arrangement to pass the particles into the subsequent contacting zone from a variable height particle column.

I claim as my invention:

1. A method for controlling the flow of subdivided solid particles from one confined contacting zone to another which comprises, passing said particles from a first contacting zone through a venturi restriction into an enlarged receiving zone, introducing an inert fluid medium into said receiving zone and providing a controlled superatmospheric pressure therein, continuously discharging particles from said receiving zone to a second contacting zone through a moving column of particles effecting a pressure seal on said receiving zone and maintaining said controlled pressure therein, and adjusting the pressure in said receiving zone to maintain a controlled pressure therein and a resulting pressure differential across said venturi between first said contacting zone and said receiving zone whereby to control the flow of subdivided particles from said first contacting zone to said second contacting zone.

2. A method for metering the flow of subdivided solid particles from one confined contacting zone to a second confined contacting zone which comprises, passing said particles from a first contacting zone through a fixed venturi restriction into an enlarged confined receiving zone, introducing an inert fluid medium into said receiving zone and withdrawing said medium therefrom in a manner maintaining a controlled superatmospheric pressure therein, continuously discharging particles from said enlarged receiving zone in continuously moving U-shaped particle column maintaining a hydrostatic pressure seal on said receiving zone, and continuously passing subdivided solid particles from said U-column to said second confined contacting zone at a rate varying with said controlled pressure effected in said receiving zone and the pressure differential between the inlet and outlet ends of the venturi restriction.

3. A method for metering the flow of subdivided solid particles from one confined contacting zone to a second confined contacting zone which comprises, discharging said solid particles from the first contacting zone through a venturi passageway into a confined receiving zone at a controlled superatmospheric pressure whereby to maintain a controlled pressure differential across said venturi, continuously passing said particles from said receiving zone through a variable height U-column of particles to a second contacting zone, permitting the height of said U-column of moving particles to vary and to maintain the pressure differential between said receiving zone and said second contacting zone and thereby controlling the rate of flow of said particles from one zone to another as a function of the pressure differential between the inlet and outlet ends of said venturi passageway.

4. The method of claim 3 further characterized in that said rate of flow of said particles from one zone to another is varied and controlled proportionately to the square root of the pressure differential maintained between the inlet and outlet ends of said venturi passageway.

GEORGE F. ADAMS.

No references cited.